United States Patent [19]

Rowley et al.

[11] Patent Number: 4,688,976

[45] Date of Patent: Aug. 25, 1987

[54] SHIPPING FACILITY HAVING RAIL MOUNTED A-FRAMES FOR SUPPORTING SHEETS

[75] Inventors: James R. Rowley, South Buffalo Township, Armstrong County; William J. Brown, Lower Burrell, both of Pa.

[73] Assignee: PPG Industries, Inc., Pittsburgh, Pa.

[21] Appl. No.: 839,257

[22] Filed: Mar. 13, 1986

Related U.S. Application Data

[63] Continuation of Ser. No. 616,870, Jun. 4, 1984, abandoned.

[51] Int. Cl.$^4$ .............................................. B61D 45/00
[52] U.S. Cl. ..................................... 410/156; 410/32; 410/67; 296/181
[58] Field of Search .......................... 410/2, 31, 32, 121, 410/127, 38, 150, 156, 66, 67; 104/95; 105/154; 296/3, 181, 182; 206/451, 452

[56] References Cited

U.S. PATENT DOCUMENTS

| | | | |
|---|---|---|---|
| 2,761,396 | 9/1956 | Harlan | 104/95 X |
| 2,940,402 | 6/1960 | Hansen et al. | 296/3 X |
| 3,155,419 | 11/1964 | Garson et al. | 296/181 |
| 3,955,676 | 5/1976 | Hansen et al. | 206/454 X |
| 4,271,927 | 6/1981 | Brown et al. | 105/154 X |
| 4,273,485 | 6/1981 | Fischer et al. | 410/32 X |
| 4,545,710 | 10/1985 | Hepp | 410/32 |

FOREIGN PATENT DOCUMENTS

| | | | |
|---|---|---|---|
| 2318159 | 11/1974 | Fed. Rep. of Germany | 206/451 |
| 2049568 | 12/1980 | United Kingdom | 296/181 |
| 0143663 | 7/1961 | U.S.S.R. | 296/3 |

Primary Examiner—Robert B. Reeves
Assistant Examiner—Scott H. Werny
Attorney, Agent, or Firm—Donald Carl Lepiane; Robert A. Westerlund, Jr.

[57] ABSTRACT

This invention relates to a shipping facility including at least one cargo supporting structure mounted for easy, sliding movement on a receiving structure disposed within the cargo bay of a cargo transport vehicle preferably adapted for side and/or rear loading and unloading, wherein the at least one cargo supporting structure and the cargo held thereby is secured, during transport thereof, by conventional retaining facilities to minimize and dampen the lateral, longitudinal, oscillatory and random transportation forces which act upon the cargo during the transport thereof. The at least one cargo supporting structure is adapted for easy slidable/rollable movement along said receiving structure between an operating position within a shipment area of the cargo bay and a non-operating position within a storage area of the cargo bay for thereby freeing the shipment area for shipment of any type of cargo which it is normally capable of holding, after the original cargo has been unloaded, and vice versa.

19 Claims, 10 Drawing Figures

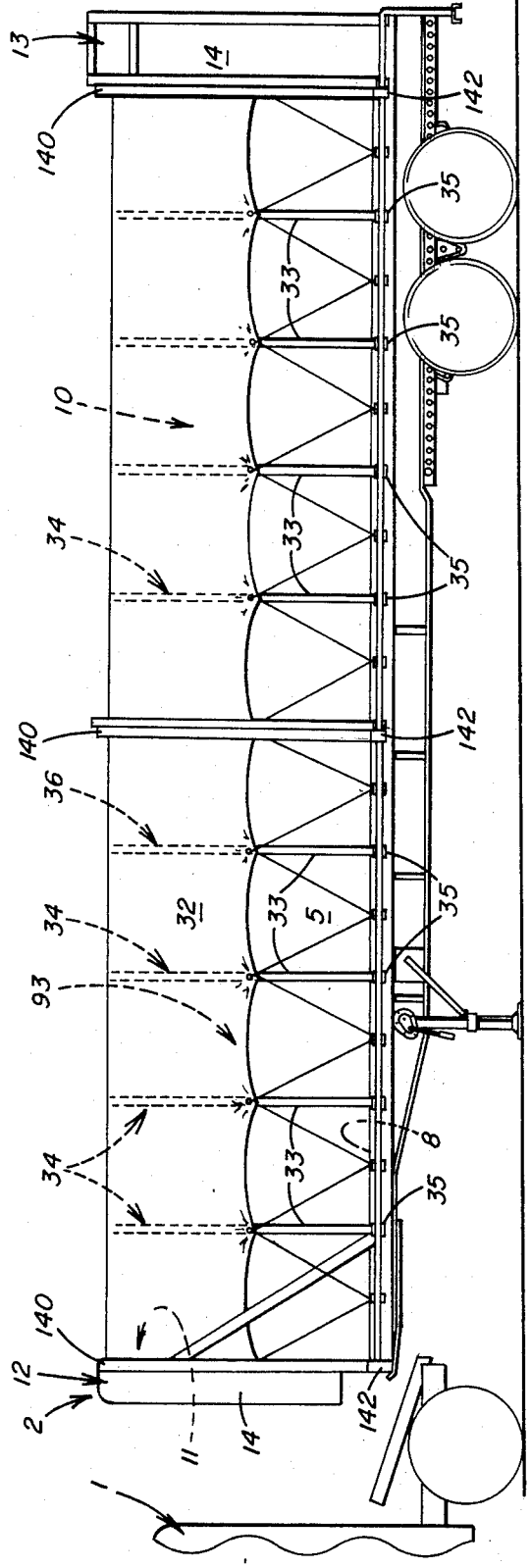
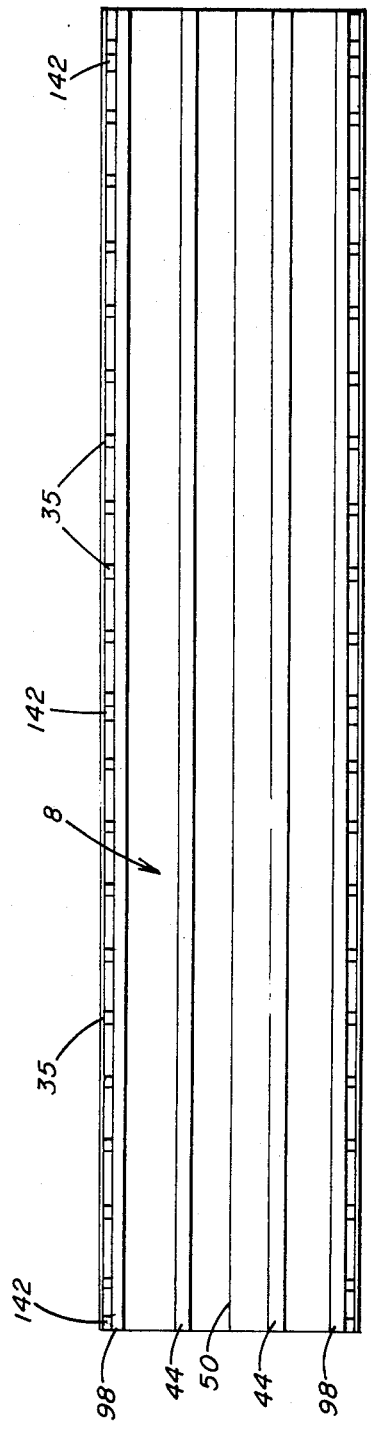
FIG. 1
FIG. 6

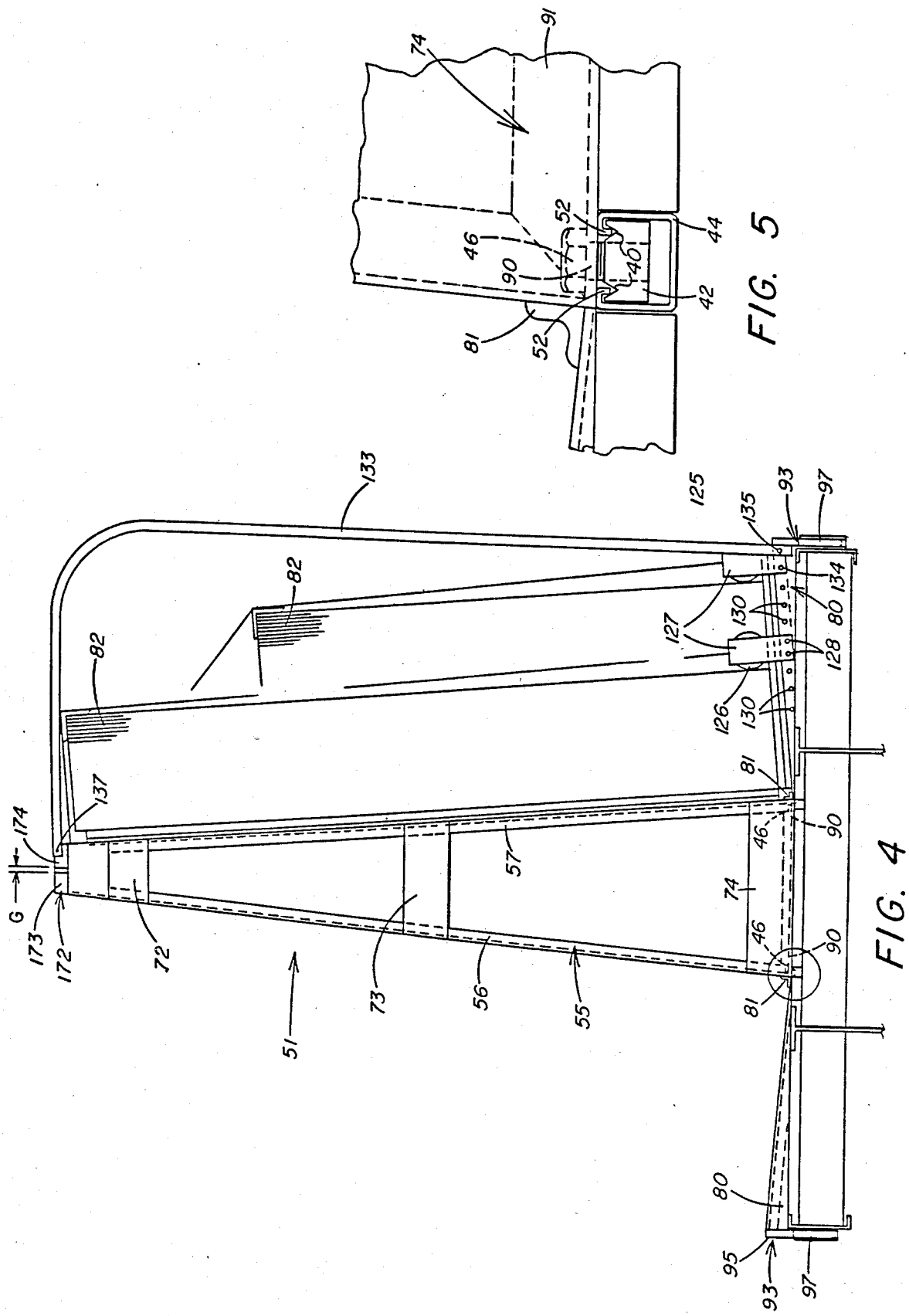

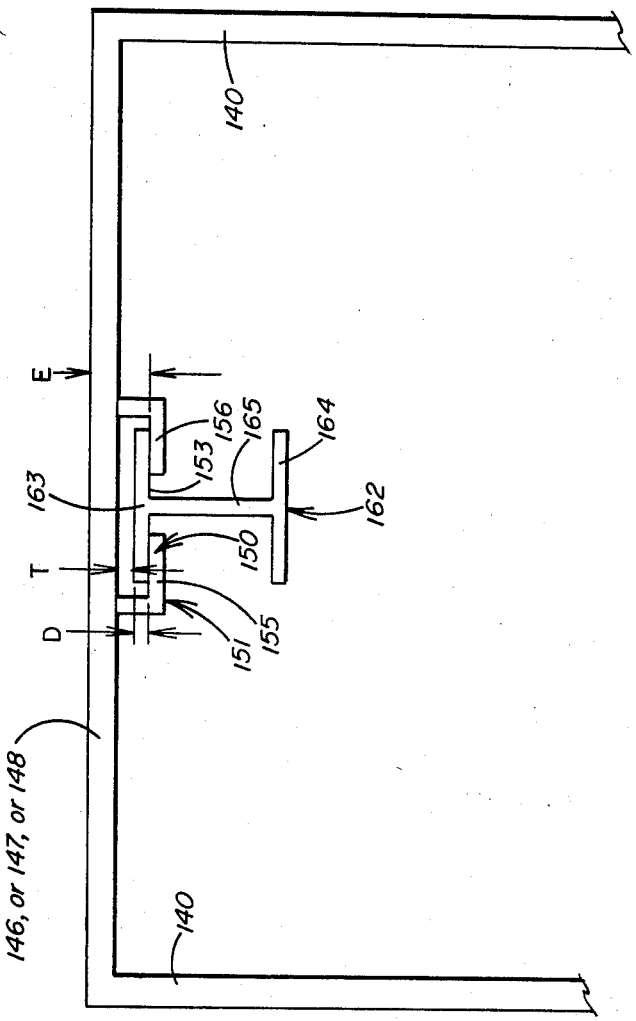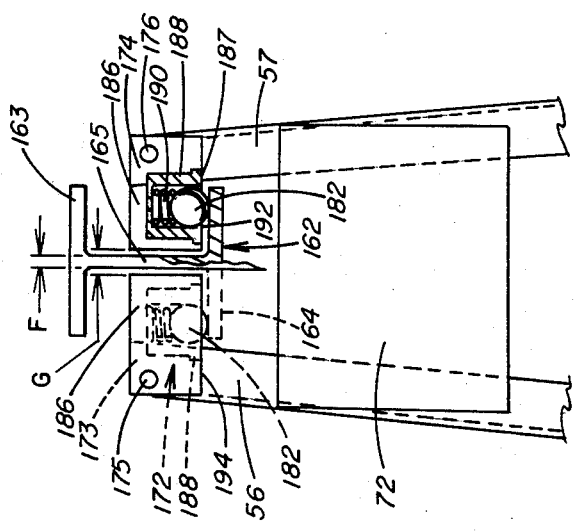

4,688,976

SHIPPING FACILITY HAVING RAIL MOUNTED A-FRAMES FOR SUPPORTING SHEETS

This is a continuation of application Ser. No. 616,870, filed June 4, 1984, now abandoned.

BACKGROUND OF THE INVENTION

I. Field of the Invention

This invention relates to a vehicle for shipping cargo, and more particularly, to movable sheet shipping racks disposed in the cargo bay of a cargo transport vehicle.

II. Discussion of the Present Technology

Sheet-like articles, e.g., glass sheets or multiple-glazed window units such as are installed in buildings, are usually transported between locations by loading the sheets on racks mounted on the flat bed of rail cars or trailers. The racks used are preferably of the type that can be assembled for shipping the sheets and thereafter disassembled to maximize space in the trailer for carrying return lading. Representative of the presently available racks that are assembled and disassembled are:

U.S. Pat. No. 3,596,755
U.S. Pat. No. 3,848,917
U.S. Pat. No. 3,878,942
U.S. Pat. No. 3,939,780
U.S. Pat. No. 3,955,676
U.S. Pat. No. 4,273,485

U.S. Pat. No. 3,569,755 teaches a glass shipping rack which includes slanting opposed walls for supporting glass sheets and an internal V-shaped member for urging the glass sheets toward the outer supporting surfaces.

U.S. Pat. No. 3,848,917 teaches a truck for shipping glass sheets in which the sheets are supported on members having their supporting surface lying in a plane parallel to the direction of travel.

U.S. Pat. Nos. 3,878,942 and 3,955,676 teach an adjustable shipping rack which include spaced A-shaped members each having slanting surfaces for supporting the sheets. Outer restraint members urge the sheets against the suporting surface of the A-shaped members.

U.S. Pat. No. 3,939,780 teaches a rack for shipping glass sheets in which the glass sheets are supported in a vertical position by adjustable members engaging each of the outer surfaces of the stack.

U.S. Pat. No. 4,273,485 teaches a glass shipping rack having a base detachably secured to the flat bed of a trailer, an adjustable back support and a slidably adjustable front restraint, wherein the side edges of the glass sheets held by the rack are disposed parallel to the sidewalls of the trailer.

All of these above-discussed racks are limited in that a labor-intensive, time-consuming, and expensive procedure is required to detach and disassemble the racks and carry them either manually or by means of machinery to a storage position in the cargo bay of the trailer to maximize the space available for shipment of return lading. Therefore, there presently exists a need for a shipping facility which provides a cargo supporting facility which can be easily and quickly stored away to provide cargo space for carrying return lading, and which is economically feasible.

SUMMARY OF THE INVENTION

This invention relates to a shipping facility including at least one cargo supporting structure mounted for easy, sliding movement on a receiving structure disposed within the cargo bay of a cargo transport vehicle preferably adapted for side and/or rear loading and unloading, wherein the at least one cargo supporting structure and the cargo held thereby is secured, during transport thereof, by conventional retaining facilities to minimize and dampen the lateral, longitudinal, oscillatory and random transportation forces which act upon the cargo during the transport thereof. The at least one cargo supporting structure is adapted for easy slidable/rollable movement along said receiving means between an operating position within a shipment area of the cargo bay and a non-operating position within a storage area of the cargo bay for thereby freeing the shipment area for shipment of any type of cargo which it is normally capable of holding, after the original cargo has been unloaded, and vice versa.

This invention also relates to a method for shipping cargo on cargo supporting structures movable within the cargo bay of a cargo transport vehicle and for slidably/rollably moving the cargo supporting structures into a storage position for shipment of return lading including any type of cargo which the cargo transport vehicle is normally cabable of holding, subsequent to discharge of the original cargo.

BRIEF DESCRIPTION OF THE DRAWINGS

FIG. 1 is a side, elevational view of a truck and trailer embodying features of this invention.

FIG. 4 is a frontal, elevational view of the preferred article supporting facility of this invention, in isolation, FIG. 5 is a fragmentary, cross-sectional view of the circled portion C of FIG. 4.

FIG. 6 is a plan view of the deck of the trailer of FIG. 1.

FIG. 9 is a frontal, cross-sectional view of the I-beam and I-beam supporting structure of the present invention, in isolation.

FIG. 10 is a frontal, elevational, partially cross-sectional view of the I-beam and the top portion of the A-frame used in the practice of this invention.

DETAILED DESCRIPTION OF THE INVENTION

Figure 3:
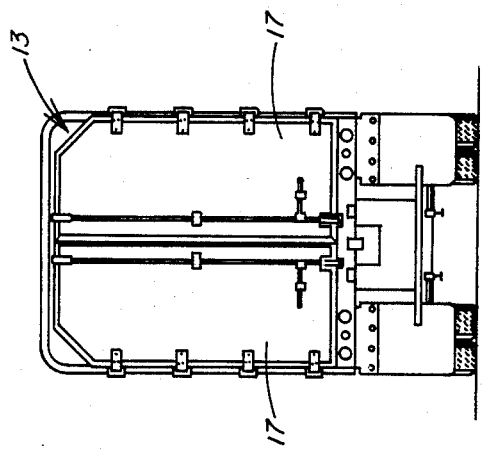
FIG. 3 is a rear end, elevational view of the trailer of FIG. 1.

In FIG. 1, there is shown a truck 1 and open-top trailer 2 of the type commonly used in the art of shipping glass sheets, e.g., of the type taught in U.S. Pat. No. 2,969,284, which are hereby incorporated by reference.

The trailer has a pair of spaced, opposed sidewalls 5,6 removably mounted to the flatbed, or deck 8 of trailer 2, in any convenient manner. Sidewalls 5,6 are removable to provide side access to the interior, or cargo bay 10 of trailer 2, for loading or unloading cargo thereinto or therefrom, respectively. The trailer 2 has a front body portion 12 and a rear body portion 13, each of which include a rigid truss framework (not shown) securely fixed to the deck 8 at the front and rear of the trailer 2, respectively. An aluminum skin covering 14 covers each of the body portions 12,13.

Figure 2:
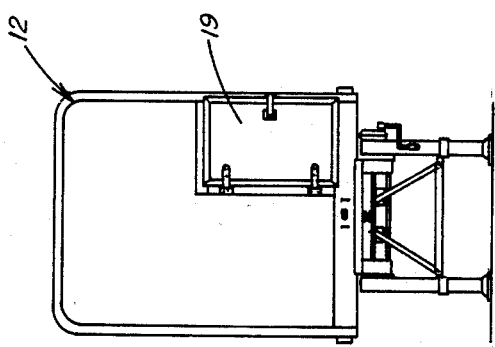
FIG. 2 is a front end, elevational view of the trailer of FIG. 1.

Referring now to FIGS. 2 and 3, a front door 19 integral to the front body portion 12 provides front access to the cargo bay 10, and a pair of rear doors 17 integral to the rear body portion 13 provide rear access to the cargo bay 10, e.g., for ingress or egress of material-handling equipment, e.g., a fork-lift (not shown), into and from the cargo bay 10. Referring again to FIG. 1, the trailer 2 preferably has a tarpaulin or canvas top covering 32 which is supported by a plurality of spaced-apart, inverted, generally U-shaped bow bars 34 which each have downwardly extending arms 33 which are removably secured within upright channel members 35 conveniently secured to the deck 8 in mutually spaced, aligned relation to each other along opposite sides of the deck 8. The elongate base portion (not shown) of each bow bar 34 is preferably enveloped by a corresponding sleeve (not shown) formed in the canvas top covering 32, thereby integrating the bow bars 34 with the canvas top covering 32 to provide a unitary covering assemblage 36. Unitary covering assemblage 36 is preferably retractable in any convenient manner to provide overhead access to cargo bay 10, as will hereinafter be further discussed. An open-top trailer having the above-discussed features is sold by Evans Products Corporation and is used in the practice of the invention, which is discussed below. As will be appreciated, the type, construction, etc. of the trailer and accessories discussed above is not limiting to the invention, and hard-top or open-top type trailers, rail cars, or any other suitable cargo transport facilities may be used within the spirit and scope of the present invention, which will now be described in detail in the following discussion.

Referring now to FIG. 4, there can be seen an article supporting facility 51 of a preferred embodiment of this invention, which includes a generally A-shaped truss or A-frame 55. The A-frame 55 includes a pair of rigid girder members 56,57 structurally interconnected by a plurality of, e.g., three, rigid plate braces 72,73,74 by means of, e.g., the end portions of the plates being welded to the outer face of each member 56,57 near the top, middle and bottom thereof, respectively. The plate length decreases from the bottom plate 74 to the top plate 72 to maintain the members 56,57 at a slight angle (e.g., 5 degrees) apart to provide slightly slanted vertical supporting surfaces for sheets stackable thereagainst, e.g., glass sheets 82, for cargo packing stability. The present invention preferably includes two pairs of spaced-apart A-frames 55, each pair detachably secured in any convenient manner to the deck 8 of the trailer 2 at a predetermined distance apart which minimizes the bending moment on the glass sheets stackable therebetween, in a manner as will hereinafter be more fully developed.

Referring additionally to FIGS. 5 and 6, the bottom plate brace 74 of each A-frame 55 preferably has a lip or flange 91 formed at its inside bottom end, the flange 91 having a pair of spaced-apart apertures 90 which are aligned with a pair of corresponding channels 44, e.g., iron channels, mounted within deck 8, preferably along the entire length thereof, on opposite sides of the central, longitudinal axis 50 of the trailer 2. Each channel 44 is preferably equidistantly spaced from the central, longitudinal axis 50. Each channel 41 preferably has a generally U-shaped cross-section and downwardly extending lips 52.

A plurality of mounting nuts 42 are slidable within the channels 44 into alignment with a corresponding number of the apertures 90 of the A-frames 55, to facilitate securement of each pair of A-frames 55 to the deck 8 at any desired distance apart, preferably at the predetermined distance apart previously discussed, by means of the bolts 46 passing through the apertures 90 and the mounting nuts 42, the nuts 42 being captured by the lips 52 of the channels 44, in the following manner. The nuts 42 preferably have a generally V-shaped circular groove 40 provided in the top surface thereof near the outer edge periphery of the top surface, the groove 40 of the nuts 42 being snugly engaged by the respective lips 52 of the channels 44, to capture the nuts 42 in the channels 44 to ensure secure, yet detachable securement of each pair of the A-frames 55 to the deck 8 at any selected distance apart.

Referring again to FIG. 4, the preferred article supporting facility 51 of this invention further includes a foot platform 80 extending outwardly and upwardly from the bottom end of the girder members 56,57 of each A-frame 55, the adjacent ends of the members 56,57 and the foot platforms 80 preferably forming a 90° angle, to provide a supporting surface or floor for the bottom edges of the glass sheets 82 stackable thereon which is normal to the slightly slanted vertical supporting surfaces provided by the girder members 56,57 of the A-frames 55, to maximize packing stability. Each foot platform 80 is wedge/force-fitted at its innermost end beneath an angle member 81, e.g., an angle iron, which is suitably fixably attached, e.g., welded, to the bottom end portion outer face of each girder member 56,57 of each A-frame 55. Each foot platform 80 of each A-frame 55 has a mounting plate 93 suitably attached to, e.g., welded to, its outer face 95, each mounting plate 93 having an apron 97 which extends downwardly beyond the bottom end of the outer face 95, the aprons 97 fitting within longitudinal elongate slots 98 provided in the deck 8 (see FIG. 6) equidistantly near the opposite sides of the trailer 2. The slots 98 preferably extend along the entire length of the deck 8 in the direction of truck travel, in spaced, parallel relation to the channels 44. The slots 98 preferably have a width slightly greater, e.g., ⅛ inches (3.76 cm.) greater than the width of the aprons 97 which are inserted therein to detachably secure the foot platforms 80 to the deck 8 at any desired location, preferably at locations corresponding to the position of the A-frames 55 which are spaced apart at any desired distance, as previously discussed. The aprons 17 of the foot platforms 80 are preferably not bolted or otherwise attached to the deck 8 within the slots 98 to facilitate quick and easy securement and removal of the foot platforms 80 from the deck 8, although this is not a limiting feature of this invention, i.e., any convenient means, e.g., bolting, can suitably be employed, in the practice of this invention, to detachably secure the foot platforms 80 to the deck 8.

Referring again to FIG. 4, there can be seen a plurality of glass sheets 82 stacked together and supported on their inner major surface by the slightly slanted vertical supporting surfaces provided by the members 57 (or 56) of the pair of spaced A-frames 55 against which the sheets 82 are stacked between. The sheets 82 are supported on their bottom edges by the foot platforms 80 of the A-frames 55 between which the sheets 82 are stacked against. The distance between each pair of the A-frames 55 is selectively adjustable in the manner previously described to minimize the bending moments on the glass sheets 82.

As can further be seen in FIG. 4, provision is made of a strap retainer and compression block assemblage 125, of the type known in the art, particularly, the type taught in U.S. Pat. No. 4,278,171, which teachings are incorporated herein by reference. A compression block 126 rests upon each foot platform 80 and is attached to, e.g., bolted to, a plate 127 which is provided with holes 128 through its bottom portion, wherein holes 128 are selectively alignable with any of a plurality of holes 130 provided through the outer major face of the foot platform 80, for receiving a nut and bolt assembly 134, or the like, for selectively securing a plate 127 and a block 126 to each foot platform 80 for accommodating stacks of glass sheets 82 of various widths. Preferably, plastic strap 133 is secured on one end to block 126, e.g., by bolt 135, and on its other end to the top end of the girder 56 or 57, corresponding to the block 126 to which its other end is attached, e.g., by bolt 137, to urge the block 126 against the bottom portion of the glass sheets 82, thereby unitizing the glass sheets 82 with the A-frame 55 to prevent outer movement of the bottom supported edges of the glass sheets 82, and to thereby minimize the lateral and oscillatory transportation forces acting upon the sheets 82 during transportation thereof.

Figure 7:
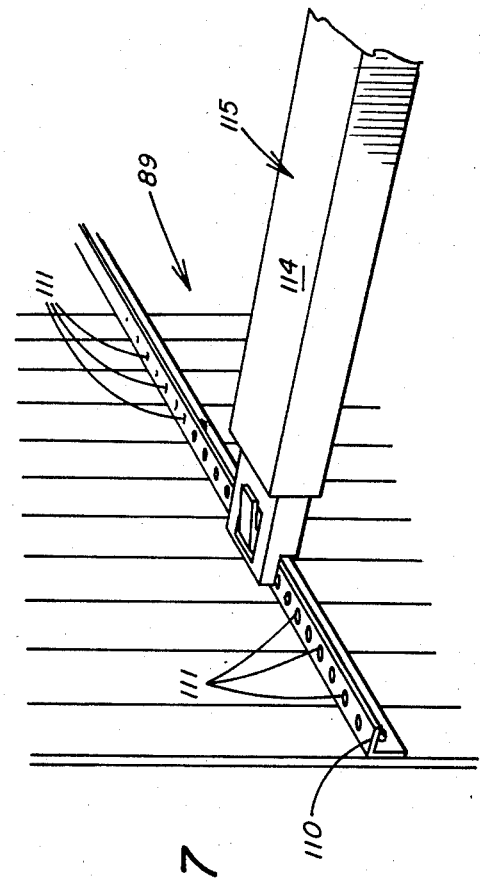
FIG. 7 is a side view of the interior of a sidewall portion of the trailer of FIG. 1 showing only the belt rail of the longitudinal retaining facilities attached thereto.
Figure 8:
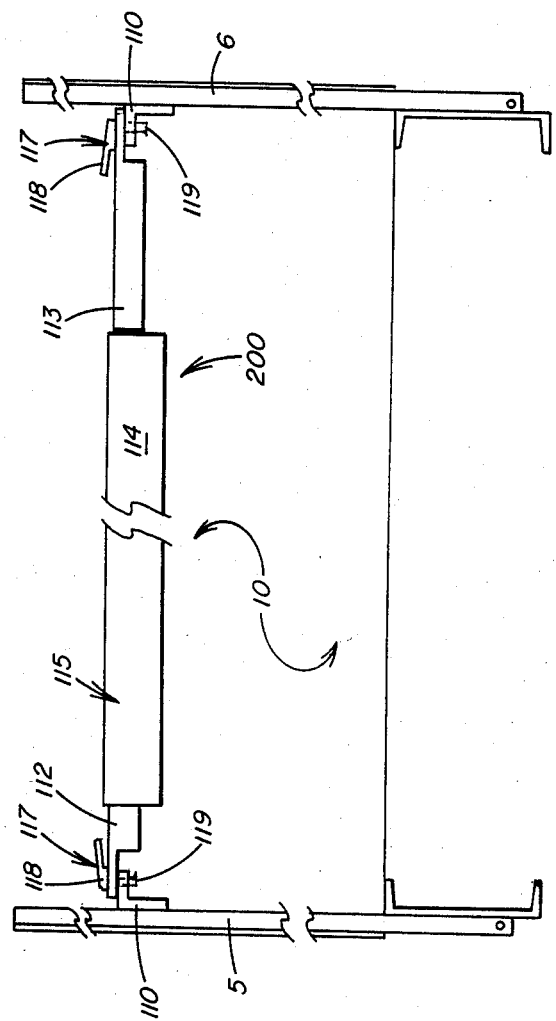
FIG. 8 is a rear end view of the trailer of FIG. 1 with the rear doors open and showing only the longitudinal retaining facilities of this invention.

Referring now to FIGS. 7 and 8, there can be seen the preferred longitudinal retaining facilities 89 of this invention, including a pair of spaced, aligned belt rails 110 conveniently attached, e.g., by rivets (not shown), to opposite sidewalls 5,6 of the trailer 2, preferably along the entire length of the trailer 2, and further including a plurality of telescoping cross-members or dunnage bars 115 extending transversely across the width of the cargo bay 10, the ends of the dunnage bars 115 being detachably secured to the belt rails 110, in any convenient manner, e.g., as will hereinafter be discussed. The belt rails 110 each preferably include a generally L-shaped member (e.g., angle iron), whose projecting flange is provided with a plurality of slightly-spaced (e.g., ½ inch (1.22 cm.) apart) perforations or holes 111 over its entire length, and whose adjacent flange is riveted or otherwise conveniently attached, to the sidewall 5 or 6 of the trailer 2 at any convenient height thereon, e.g., 2/5 of the distance from the bottom to the top of the sidewall 5 or 6.

Each dunnage bar 115 preferably includes a rigid, elongate generally rectangular bar 114 having a stationary end portion 112 and a telescoping opposite end portion 113. The bar 114 is constructed of any suitably strong and durable material such as hardwood and/or steel. The end portions 112,113 of each dunnage bar 115 have a locking device 117 having two spring-loaded lugs 119 which are releasable by trigger 118 for downward movement into clamping engagement with any selected two adjacent holes 111 of the adjacent belt rail 110. The holes 111 selected are preferably such as to put the dunnage bars 115 in abutting or at least adjacent relationship to the side edges of the glass sheets 82 held by the article supporting facilities 51, to minimize the longitudinal movement thereof, and especially to minimize the longitudinal transportation forces acting upon the glass sheets 82 during transportation/shipment thereof.

The longitudinal retaining facilities 89 just described are not limiting to this invention, as any convenient retaining facilities may be used in the practice of this invention to minimize damage to the articles/cargo, especially during transit. A longitudinal retaining facility essentially identical to the one above-described, is sold by Evans Product Company, Plymouth, Mich., and is shown and described on pp. 2 and 3 of their booklet, "How to Use Evans DF Equipment."

All of the contacting surfaces of the girders 56,57, the foot platforms 80, the dunnage bars 115, the compression block 126, etc., are provided with a resilient, e.g., rubber, pad or cushion (not shown), to thereby prevent marring of the glass sheets 82. Additionally, dunnage (not shown) may be provided as necessary, e.g., between the dunnage bars 115 and the side edges 83 of the glass sheets 82, in any convenient manner, to further dampen the transportation forces acting upon the glass sheets 82 during shipment thereof.

Although the A-frame 55 has been discussed in some detail, it will become apparent to those skilled in the art that many variations can be made thereto or alternative article supporting facilities employed in lieu thereof in the practice of this invention, without departing from the spirit and scope thereof. Further, although the glass sheets 82 are shown to be secured to the A-frame 55 by means of the block 126 and the strap 133, the dunnage bars 115 and the securement of the A-frames 55 to the deck 8 of the trailer 2, etc., it should be understood that these are not limiting aspects of this invention, i.e., the type, construction and means of securement, etc., of the cargo supporting and/or securing facilities are not in any way limiting to this invention. Further, this invention is not limited to use with loose glass sheets and may be used to haul glass sheets packed in crates, as well as metal sheets, wood sheets, crates or any other type of cargo normally shipped in trailers.

Referring now to FIGS. 1 and 9, this invention is shown to further include a plurality of paired, aligned, spaced-apart, upright, elongate/vertical rigid posts 140, e.g., generally rectangular steel tubing, preferably fixably attached, in any convenient manner, to the deck 8 of the trailer 2, along either side thereof adjacent to the temporary sidewalls 5,6 between the front and rear permanent body portions 12,14, such as by welding the lower end thereof within channels 142 mounted within deck 8. Each corresponding pair of upright posts 140 are preferably fixably, structurally interconnected by rigid cross-members 146,147, and 148, e.g., steel cross-beams welded, or otherwise suitably fixably attached, at both ends, to the top portion of the posts 140. As can be seen in FIG. 9, cross-members 146,147 and 148 each have a generally U-shaped mounting brace 151 fixably attached to, e.g., welded to, their underside, the base 150 of each mounting brace 151 having an intermediate slot 153 therethrough which divides the brace 151 into two equal generally L-shaped portions 155,156. As can further be seen in FIG. 10, a rigid, elongate longitudinal member 162, suitably a steel I-beam 162 having a top flange 163 and a bottom flange 164 rigidly interconnected by a vertical member 165, is disposed along the central, longitudinal axis 50 of the trailer 2, in the direction of truck travel, by the vertical member 165 passing through, with some tolerance (e.g., 1 inch (2.54 cm.)), the intermediate slots 153 of the mounting braces 151 of the cross-members 146,147 and 148, and the top flange 163 passing through the interior of the mounting braces 151. The depth D of top flange 163 is lesser than the depth E of the mounting brace 151 interior to provide some tolerance T (e.g., 1 inch (2.54 cm.) for absorption of transportation forces. More particularly, when a depending heavy load is applied to the suspended I- beam 162, the I-beam 162 is caused to bow downwardly and extend longitudinally outwardly. The tolerance T allows the downward bow, and the length of the I-beam 162 is made shorter than the length of the trailer 2 (e.g., by 2 inches (5.08 cm.)) to allow the outward movement. As will become readily apparent to those skilled in the art, many different and alternative means may be employed for supporting the I-beam 162 without departing from the scope of this invention.

Referring now to FIG. 10, there can be seen a bifurcated housing 172 having first and second generally rectangular housing parts 173, 174, respectively. The first part 173 is attached to the top end of the girder 56 and the second part 173 is attached to the top end of the girder 57, via nut and bolt assemblies 175, 176, respectively. The first part 173 and the second part 174 of the housing 172 are spaced-apart by a distance G, preferably just greater than the width F of the vertical member 165 of the I-beam 162 which is interposed therebetween, for thereby ensuring that the housing 172 is maintained or guided along the I-beam 162 during movement therealong, as is hereinafter more fully developed.

The first part 173 and the second part 174 each contain a generally cylindrical internal sleeve 188 attached, e.g., welded, between their top surface 186 and bottom surface 187. Each sleeve 188 preferably contains a steel ball caster 182 having a preferably just slightly lesser diameter than the sleeve 188, wherein each ball caster 182 is preferably normally biased downwardly by a compression coil spring 190 suitably welded at its top end to the top surface 186 of the first part 173 or the second part 174 of the housing 172, within the sleeve 188. The first part 173 and the second part 174 each have an aperture 192 through their bottom surface 194, having a diameter less than that of the ball caster 182. The caster 182 is rotationally movable within the aperture 192 when the coil spring 190 is in its normal state, and only a portion of the caster 182 is allowed to protrude downwardly through the aperture 192 into contact with the upper surface of the bottom flange 164, due to the diametrical difference between the aperture 192 and the caster 182. The construction and operation of the housing 172 and the ball caster 192 are not limiting to the invention, and a spring-loaded ball caster essentially identical to the one just discussed is sold by McCaster-Carr Supply Company, Pennsylvania, Catalog No. 2415T23.

Referring to FIGS. 1 and 10, the discussion will now be directed to the cooperation of the housing 172 and the ball caster 182 housed thereby, with the I-beam 162, for facilitating the easy, rolling/sliding movement of the A-frames 55 along the I-beam 162 for enabling quick, easy and inexpensive movement of the A-frames 55 into a cargo-receiving position within a shipment area 93 of the cargo bay 10 of the trailer 2, and into a storage position within a storage area 11 of the cargo bay 10, for thereby freeing the shipment area 93 for shipment of return lading after discharge of the original cargo. Each A-frame 55 is mounted for easy, sliding/rolling movement along the I-beam 162, by way of the ball casters 182 resting freely on the upper surface of the bottom flange 164 of the I-beam 162 due to each compression coil spring 190 urging each caster 182 downwardly under sufficient tension/biasing force to provide load-bearing strength to the casters 182 to enable them to support the entire weight of the A-frame 55 when it is in its unloaded state, or normal condition. In this condition, which occurs either prior to loading of cargo onto A-frames 55 or subsequent to the unloading of cargo therefrom, in any suitable manner, such as by a bow bar and spreader assembly (not shown) in conjunction with a crane (not shown) or other suitable hoisting means (not shown.), the A-frame 55 is easily and quickly movable, by the ball casters 182 rolling along the I-beam 55, into any desired position within the cargo bay 10 of the trailer 2. When A-frame 55 is even partially loaded, e.g., with glass sheets 82, coil springs 190 are preferably compressed sufficiently to cause bottom surfaces 194 of first part 173 and second part 174 of housing 172 to directly abut/engage the upper surface of bottom flange 164 of I-beam 162, thereby preventing ball casters 182 from rolling therealong, thereby ultimately, in conjunction with the attachment of A-frames 55 to deck 8, and the dunnage bars 115, preventing longitudinal movement of the A-frames 55 during cargo transport. The I-beam 162 also prevents racking of the A-frames 55, i.e., prevents inward and downward buckling of the A-frames 55, thereby providing rigid structural stability for the A-frames 55.

The present invention in actual practice, can be used in the following manner:

each pair of A-frames 55 are detachably secured to the deck 8 at a distance apart which minimizes the bending moment on the articles, e.g., the glass sheets 82, as previously discussed, by way of passing the bolts 46 through the apertures 90 and the mounting nuts 42, whereupon after being tightened sufficiently, the nuts 42 are captured by the lips 52 of the channels 44;

the foot platforms 80 are then removably secured to the deck 8 in a manner hereinbefore described, by way of wedging/force-fitting the innermost ends beneath the correspondent angle members 81 and inserting the apron 97 of the mounting plates 93 into the longitudinal slots 98;

the glass sheets 82 are then loaded onto the article supporting facilities 51 within the shipment area 93 of the cargo bay with their inner major surfaces supported by the girder members 56 and 57 and their bottom edges supported by the foot platforms 80;

the dunnage bars 115 are detachably secured to the belt rails 110 preferably in abutting relation to the side edges of each stack of glass sheets 82, in a manner hereinbefore described, by manipulating trigger 118 to release the lugs 119 of the end portions 112, 113 into clamping engagement with the appropriate holes 111 of the belt rails 110;

the glass sheets 82 are secured to and unitized with the article supporting facilities 51, by way of securing (with the nut and bolt members 134) the plates 127 of the compression block and strap retainer assemblages 125 to the foot platforms 80 in a position such as to cause the compression blocks 126 to directly abut/engage the outer major face of the outermost glass sheet 82;

the weight of the loaded A-frames 55 overcomes the downward tension of the coil spring 190, thereby causing the bottom surfaces 194 of the bifurcated housings 172 to engage the upper surface of the bottom flange 164 of the I-beam 162, thereby contributorily preventing rolling movement of the A-frames 55 along the I-beam 162, even during shipment of the glass sheets 82;

after the glass sheets 82 are unloaded off of the article supporting facilities 51, the ball casters 182 are caused to rollably engage the upper surface of the bottom flange 164 by the upward biasing force of the coil springs 190 overcoming the downward force of the weight of the A-frames 55;

the A-frames 55 are easily and quickly detached and the foot platforms 80 easily and quickly removed from the deck 8 in substantially the reverse manner in which they were secured to the deck 8; the dunnage bars 115 are then easily and quickly detached from the belt rails 110 by manipulating the triggers 118 of the end portions 112,113 of the dunnage bars 115 to lift the lugs 119 out of clamping engagement with the holes 111 of the belt rails 110;

the dunnage bars 115 and the foot platforms 80 are then carried, e.g., by hand or with a machine, to the storage area 11 of the cargo bay 10 and stacked or arranged therein in any suitable configuration;

the A-frames 55 are easily and quickly moved by manually pushing or with use of a machine, to the storage area 11 of the cargo bay 10 by way of the ball casters 182 rolling along the upper surface of the bottom flange 164 (adequate lubrication would be present at the ball caster/bottom flange interface to ensure that the movement is easy), into the storage area 11 of the cargo bay 10;

a restraining member 200, e.g., a dunnage bar 115, is then disposed across the width of the storage area 11 to minimize movement of the stored foot platforms 80, the dunnage bars 115, the compression block and strap retainer assemblages 125, the A-frames 55 and any other materials or equipment desired to be stored in the storage area 11, and to prevent movement thereof into the shipment area 93; and the shipment area 93 of the cargo bay 10 is then free for return shipment of any type of cargo which it is normally capable of holding.

It will become readily apparent to those skilled in the pertinent art that many other alternative methods may be employed without departing from the spirit and scope of this invention.

Further, although A-frames having ball caster means for rolling movement along an I-beam have been discussed in detail, it will become readily apparent to those skilled in the pertinent art that many variations to this means or many different alternative means may be utilized in order to effect the easy, sliding/rolling movement of the A-frames or any other suitable cargo/article supporting facilities into operative/shipping and non-operative/storage positions, without departing from the spirit and scope of the present invention, e.g., a rail member could be provided at the top of the A-frames for reciprocal movement along an elongated bushing member suitably provided by the trailer or rail car. Further, the runner means could be provided along the deck (or sides) of the trailer and the cargo supporting facilities could have means at its bottom end for cooperative sliding/rolling relationship therewith. Additionally, any number of I-beams or other "track facilities" could be employed in any suitable configuration, e.g., a pair of spaced-apart I-beams may be used to accommodate two separate rows or banks of A-frames or other suitable cargo supporting facilities for reciprocating movement therealong, within the spirit and scope of this invention.

The features which are considered novel characteristics of this invention are set forth in particular in the appended claims.

What is claimed is:

1. In a vehicle having a cargo bay including a shipment area and a storage area for transporting sheet-like articles, a shipping facility, comprising:
   at least one pair of spaced-apart A-frames adapted for supporting said sheet-like articles;
   runner means disposed in said cargo bay for receiving said A-frames;
   ball caster means carried by each said A-frame and adapted for rollable/slidable movement along said runner means to facilitate movement of said A-frames between an operating position within said shipment area of said cargo bay and a non-operating position within said storage area of said cargo bay;
   access facilities provided by said vehicle for allowing rear and side loading and unloading of said sheet-like articles into and from said cargo bay, respectively; and
   facilities for restricting the movement of said A-frames and said sheet-like articles supported thereby, for minimizing damage occasioned to said articles during transport thereof.

2. The shipping facility as set forth in claim 1, wherein each said A-frame includes:
   a pair of divergent, slightly slanted, vertical members for supporting a major surface of said sheet-like articles;
   a first foot platform extending outwardly from a bottom portion of one of said vertical members;
   a second foot platform extending outwardly from a bottom portion of the other said vertical member;
   means for detachably securing said first and said second platforms to deck of said cargo bay; and
   wherein said first and said second foot platforms are each adapted to support the bottom edges of selected ones of the sheet-like articles.

3. The shipping facility as set forth in claim 2, wherein each said A-frame further includes restraining facilities for holding the sheet-like articles thereto, to thereby minimize damage to the sheet-like articles due to transportation forces acting thereupon during transport thereof.

4. The shipping facility as set forth in claim 3, wherein said restraining facilities associated with each said A-frame includes:
   a block mounted to each of said first and said second foot platforms in abutting relationship to a bottom portion of a major surface of the outermost one of the sheet-like articles;
   a strap retainer attached to a top portion of the associated said A-frame at one end and the associated one of said blocks at its other end, for thereby urging said block against a bottom portion of the sheet-like articles, to thereby minimize lateral and oscillatory movement of the sheet-like articles during transport thereof.

5. The shipping facility as set forth in claim 4, wherein each said A-frame further includes a plurality of brace support members securedly interconnecting said vertical members.

6. The shipping facility as set forth in claim 5, wherein said vehicle includes a trailer having a top, a bottom, a front, a back, and spaced, opposed side walls, defining said cargo bay, and a truck functionally connected to said trailer for transporting said trailer.

7. The shipping facility as set forth in claim 6, wherein said restricting facility includes a plurality of dunnage bars disposed in said cargo bay transverse to the direction of movement of said trailer, between said side walls, adjacent to the side edges of the sheet-like articles, for thereby minimizing longitudinal movement of the sheet-like articles.

8. The shipping facility as set forth in claim 4, wherein said runner means comprises at least one I-beam having a top flange and a bottom flange interconnected by vertical member, wherein said I-beam is supported by means provided by said vehicle, and wherein further, said I-beam is disposed about said cargo bay along the longitudinal axis of said trailer.

9. The shipping facility as set forth in claim 8, wherein said ball caster means carried by each said A-frame includes a bifurcated housing having a first part attached to a top portion of one of said vertical members and a second part attached to a top portion of the other said vertical member, in spaced, opposed relation to said first part, wherein the distance between said first part and said second part is greater than the width of said vertical member of said I-beam which is interposed between said first and said second parts which are interposed between said top flange and said bottom flange, wherein said first and said second part each house a ball caster disposed in rolling relationship to said bottom flange of said I-beam for facilitating movement of each said A-frame between said operating and said non-operating position, and vice versa.

10. The shipping facility as set forth in claim 9, wherein said first part and said second part of said bifurcated housing each further include biasing means responsive to the weight of the sheet-like articles loaded onto said A-frames for urging said ball casters between an inactive condition wherein said ball casters are not rollably engaged with said bottom flange and an active condition wherein said ball casters are rollably engaged with said bottom flange, wherein when said ball casters are in said inactive condition, said A-frames are not rollably movable along said at least one I-beam and wherein when said ball casters are in said active condition, said A-frames are rollably movable along said at least one I-beam.

11. In a vehicle having a cargo bay including a shipment area and a storage area, for transporting sheet-like articles, a shipping facility comprising:
at least one pair of spaced-apart A-frames adapted for supporting said sheet-like articles;
runner means disposed in said cargo bay for receiving said A-frames;
a rail member carried by each said A-frame and adapted for slidable movement along said runner means to facilitate movement of said A-frames between an operating position within said shipment area of said cargo bay and a non-operating position within said storage area of said cargo bay;
access facilities provided by said vehicle for allowing rear and side loading and unloading of the sheet-like articles into and from said cargo bay, respectively; and
facilities for restricting the movement of said A-frames and said sheet-like articles supported thereby, for minimizing damage occasioned to said articles during transport thereof.

12. A shipping facility as set forth in claim 11, wherein said runner means includes an elongate bushing member disposed about said cargo bay along the longitudinal axis of said vehicle, in the direction of vehicle travel.

13. The shipping facility as set forth in claim 12, wherein the sheet-like articles are glass sheets.

14. A shipping facility for a trailer having a deck, comprising:
a rail;
first mounting means for mounting said rail spaced from and above the deck;
means for supporting the cargo to be shipped;
second mounting means for mounting said cargo supporting means for movement along said rail, said second mounting means including biasing means acting on said rail to bias said cargo supporting means away from the deck; and,
means for detachably securing said cargo supporting means to the deck of the trailer, wherein said cargo supporting means detachably secured to the deck acts against biasing action of said biasing means.

15. The shipping facility as set forth in claim 14, wherein said second mounting means comprises roller means.

16. The shipping facility as set forth in claim 14, wherein the cargo comprises glass sheets, and wherein further, said cargo supporting means comprises a first support means for supporting a major surface of said glass sheets, and a second support means for supporting the bottom edge of said glass sheets.

17. The shipping facility as set forth in claim 16, wherein said cargo supporting means is freely suspended from said rail by the biasing action of said biasing means when said cargo supporting means is in an unloaded condition.

18. The shipping facility as set forth in claim 16, wherein said cargo supporting means comprises at least one pair of spaced-apart A-frames.

19. The shipping facility as set forth in claim 16, wherein said trailer is of the open-top type.

* * * * *

UNITED STATES PATENT AND TRADEMARK OFFICE
CERTIFICATE OF CORRECTION

PATENT NO. : 4,688,976

DATED : August 25, 1987

INVENTOR(S) : James R. Rowley and William J. Brown

It is certified that error appears in the above-identified patent and that said Letters Patent is hereby corrected as shown below:

Claim 8 (column 11, line 5) "in claim 4" should be "in claim 7".

Signed and Sealed this

Second Day of August, 1988

Attest:

DONALD J. QUIGG

Attesting Officer

Commissioner of Patents and Trademarks